(12) United States Patent
Trzecieski et al.

(10) Patent No.: US 6,560,014 B1
(45) Date of Patent: May 6, 2003

(54) METHOD AND DEVICE FOR CONTROLLING THE POLARIZATION OF A BEAM OF LIGHT

(75) Inventors: Mike Trzecieski, Ottawa (CA); Louis Allard, Ottawa (CA); Clark Merchant, Ottawa (CA); Alex Tager, Kanata (CA)

(73) Assignee: JDS Uniphase Inc., Ottawa (CA)

( * ) Notice: Subject to any disclaimer, the term of this patent is extended or adjusted under 35 U.S.C. 154(b) by 160 days.

(21) Appl. No.: 09/652,795

(22) Filed: Aug. 31, 2000

Related U.S. Application Data (60) Provisional application No. 60/198,574, filed on Apr. 20, 2000.

(51) Int. Cl.$^7$ ............................................. G02B 5/30
(52) U.S. Cl. ....................... 359/484; 359/494; 359/483; 359/495; 359/497; 385/11; 385/31
(58) Field of Search ........................ 385/2, 3, 11, 14, 385/28, 31, 40, 129, 130, 132; 359/483, 484, 494, 495, 497

(56) References Cited

U.S. PATENT DOCUMENTS

| | | | | |
|---|---|---|---|---|
| 4,898,441 A | | 2/1990 | Shimizu | ............... 350/96.14 |
| 5,212,743 A | * | 5/1993 | Heismann | ............... 385/11 |

* cited by examiner

*Primary Examiner*—Audrey Chang
*Assistant Examiner*—Craig Curtis
(74) *Attorney, Agent, or Firm*—Neil Teitelbaum (57) ABSTRACT

An electrooptic waveplate for changing the state of polarization of light passing therethrough is disclosed. The waveplate provides a substantially constant birefringence when the principle birefringent axes of the electrooptic waveplate are rotated. The waveplate is an electro-optical material having two principle orthogonal birefringent axes that are rotable when suitable voltages are applied. Two related different voltages are applied along sequential or contiguous regions along the length L of the electo-optical waveplate for providing a controllable and varying electric field along the length L, such that retardance of the waveplate of the length L remains substantially constant while the birefringent axes of the elecrooptic waveplate are rotated by varying the voltages. The two different voltages have a phase relationship or a phase and magnitude relationship therebetween.

14 Claims, 7 Drawing Sheets

METHOD AND DEVICE FOR CONTROLLING THE POLARIZATION OF A BEAM OF LIGHT

This application claims benefit of Provisional No. 60/198,574 filed Apr. 20, 2000.

FIELD OF THE INVENTION

This invention relates to devices for controlling polarization of incident optical signals and, more particularly, to devices which permit endless or reset-free operation.

BACKGROUND OF THE INVENTION

Optical signals in standard, non-polarization preserving optical fibre-based communication systems experience random changes in polarization state from one end of the fibre to the other due to fibre birefringence induced by temperature fluctuations and physical stresses on the fibres. Random polarization changes are evidenced at the output end as polarization mode dispersion (PMD) fluctuations.

In order to correct the polarization state of lightwave signals emerging from the optical fibre transformers have been developed to transform the fibre output polarization into the prescribed polarization state for applications such as heterodyne detection and interferometric signal processing. Conventional polarization transformers provide compensation but require a reset cycle when their operating range is exceeded. Unfortunately, reset cycles give rise to periods of unacceptable data loss. Endless polarization transformers provide continuous control of the polarization state over an infinite range of polarization compensation.

Endless polarization transformers have been developed using cascaded polarization transformers having a limited transformation range such as fibre squeezers and electrooptic devices using lithium niobate or PLZT. While these cascaded devices permit truly endless (reset free) operation, individual elements within the devices still require occasional reset cycles. Although the reset cycles can be performed without affecting the overall polarization transformation (quasi-endless polarization control), these devices generally fail to permit polarization control during reset cycles. Moreover, they require sophisticated and even computer controlled drive algorithms for proper operation.

Fibre squeezers mechanically induce birefringence in the fibre axes to cause retardation between the two orthogonal modes perpendicular and parallel to the direction of pressure. U.S. Pat. No. 5,561,726 in the name of Yao, describes a system that utilizes a rotatable fibre clamp to supply the necessary retardation and optical axis orientation. Although this device can be used for fixed wavelength and temperature and polarization it cannot be used to control real time polarization fluctuation in transmission fibres, because it requires mechanical movement for its control.

In the past, a reset-free, endless polarization transformer was demonstrated performing general polarization transformations from any arbitrarily varying optical input polarization into any arbitrarily output polarization by producing adjustable elliptical birefringence of constant total phase retardation in a single-mode waveguide. See U.S. Pat. No. 4,966,431 issued to Heismann on Oct. 30, 1990. A particular transformation is obtained by adjusting the azimuth of linear birefringence and the ratio of linear to circular birefringence. In its integrated-optic realization, the endless polarization transformer includes at least one cascadable transformer section comprising cascaded first and second TE TM mode converters. Phase shifting (TE/TM) is performed in a section between the mode converters, in a section following the mode converters, or both between and following the mode converters. All sections are formed over a birefringent waveguide capable of supporting propagation of TE and TM optical signal modes. While the recent endless, reset-free polarization transformer is cascadable and affords simplicity of design and operation over prior art devices, it cannot be overlooked that this polarization transformer has a relatively narrow optical bandwidth at wavelengths of interest less than 1 nm at 1.55 $\mu$m and permits only limited tunability over a small wavelength range approximately 10 nm.

Heismann in U.S. Pat. No. 5,212,743 entitled Automatic Polarization Controller Having Broadband Reset-Free Operation, incorporated herein by reference discloses a wide optical bandwidth and broad wavelength tuning range achieved in a reset-free, optical, automatic polarization controller by combining three controllable fractional wave elements in cascade and further by controlling the orientations of both outermost fractional wave elements to differ by a prescribed angular amount which is maintained substantially constant. Synchronous control of both outermost fractional wave elements maintains the prescribed angular difference constant during operation of the polarization controller.

In the embodiments described by Heismann, the three fractional wave elements are provided in the form of an endlessly rotatable half-wave element and two synchronously rotatable quarter-wave elements wherein the half-wave element is placed between the quarter-wave elements. Each fractional wave element varies the orientation of retardance along its optical wavepath and introduces a specified phase retardation. Embodiments of the polarization controller are realized using either distributed bulk optic devices or integrated electro-optic waveguide devices. Rotation of the elements is afforded by a feedback control circuit which monitors the output optical polarization and derives appropriate electrical drive signals to achieve the proper rotation of the elements. Although the device taught by Heismann appears to achieve its intended function in many instances it does not provide a precise enough, hence an ideal-enough quarter or half waveplate. For example, in practice, it has been found that controllers of the type taught by Heismann are very difficult to manufacture with enough precision with materials that are uniform enough in their response, to provide glitchless operation. For example, misalignment of the electrodes on the birefringent material, or non-uniformity in the birefringent material will negatively affect the performance of the device.

In contrast, the instant invention provides a means for attaining superior performance by providing means to compensate for such aberrations. Essentially a greater resolution is afforded and by achieving this, imperfect regions, deviations in the birefringent material, or mis-alignment can be compensated for to achieve a substantially fixed retardance within a waveplate section of, for example a typical three-section controller.

It is an object of this invention to provide an automatic polarization controller having broadband operation wherein the quarter waveplates and half the waveplate are nearly ideal.

It is a further object of the invention to provide an inexpensive, highly responsive device for controlling polarization of an input beam of light having varying polarization states.

It is a further object of this invention to provide a controllable quarter waveplate or half waveplate for use, for example in a polarization control circuit.

SUMMARY OF THE INVENTION

In accordance with the invention, an electro-optic waveplate for changing the state of polarization of light passing therethrough while providing a substantially constant birefringence when the principal birefringent axes of the electro-optic waveplate are rotated is provided, comprising:

a birefringent material having two principal orthogonal birefringent axes that are rotable in the presence of a suitably applied voltages, the birefringent material having a first end and a second end and having a longitudinal axis of length L defined therebetween;

means for controllably providing at least four related different voltages along sequential or contiguous regions along the length L for providing a controllable and varying electric field along the length L, such that retardance of the waveplate of the length L remains substantially constant while the birefringent axes of the electro-optic waveplate are rotated by varying at least the voltages, wherein the at least four different voltages have a phase relationship or a phase and magnitude relationship therebetween.

In accordance with the invention, there is further provided, a quarter waveplate or a half waveplate comprising a first pair of electrodes spaced apart along a block of birefringent material serving as voltage terminals to provide two different and related electric fields through the material simultaneously in response to two different applied voltages;

a second pair of electrodes spaced apart along the block of birefringent material serving as voltage terminals to provide two other electric fields through the material simultaneously in response to two other applied voltages; and means for applying voltages of the form $$V_1 = V_{s1} \sin(\theta) + V_{C1} \cos(\theta) + V_{T1}$$

$$V_2 = V_{S2} \sin(\theta) + V_{C2} \cos(\theta O) + V_{T2}$$

to the first electrodes, and
voltages of the form:

$$V_{1'} = V_{S1'} \sin(\theta+\alpha) + V_{C1'} \cos(\theta+\alpha) + V_{T1'}$$

$$V_{2'} = V_{S2'} \sin(\theta+\alpha) + V_{C2'} \cos(\theta+\alpha) + V_{T2'}$$

to the second electrodes,
where $0 < \alpha < 360°$ and where $\theta$ can be any angle and endlessly varying.

In accordance with the invention there is further provided, a polarization controller comprising electrically controllable waveplates arranged in a predetermined spatial relationship having a same longitudinal axis of propagation to allow light launched into one of the waveplates to propagate through the other of the waveplates, at least one of the waveplates being formed of plural pairs of electrodes spaced across a birefringent material to provide at least four different electric fields along the axis of propagation through the material to light propagated therein in the presence of suitably applied voltages; and, means for providing the suitably applied voltages to yield the at least four different electric fields to light passing through the birefringent material, such that a substantially quarter or half wavelength of retardance will result for light passing therethrough wherein the at least four different electric fields are of a magnitude and phase to ensure a substantially constant retardance through said one waveplate as birefringent axes of the waveplate are rotated.

In accordance with another aspect of the invention a method of providing a near-ideal quarter or half waveplate is provided comprising the steps of:

launching a signal into a block of electro-optical material having a length L;

providing four different voltages to the block of electro-optical material that will yield four different fields therethrough along the length L, where the voltages have a magnitude or phase relationship therebetween; and ensuring that product of the length and voltages is sufficient to a substantially constant retardance along the length L in the presence of the two different fields.

In accordance with the invention, a polarization transformer is provided for controlling the polarization and phase of an optical signal comprising:

a block of electro-optical material having a plurality of electrode pairs thereon for applying quadrature voltages thereto, each pair of terminals having a third common terminal disposed therebetween, said block of birefringent material, in the presence of an applied voltage for forming a near-ideal controllable waveplate, a first plurality of the plurality of pairs of electrodes for inducing a phase retardation of an optical signal passing through the block of substantially about $\pi/2$ radians and forming a first quarter waveplate; a second plurality of the pairs of electrodes for inducing a phase retardation of an optical signal passing through the block of substantially about $\pi$ radians forming a first half waveplate; and, a third plurality of the plurality of pairs of electrodes for inducing a phase retardation of an optical signal passing through the block of substantially about $\pi/2$ radians and forming a second quarter waveplate. The three above-mentioned waveplates need not lie in a particular order.

BRIEF DESCRIPTION OF THE DRAWINGS

Exemplary embodiments of the invention will now be described in conjunction with the drawings in which.

DETAILED DESCRIPTION

Figure 1:
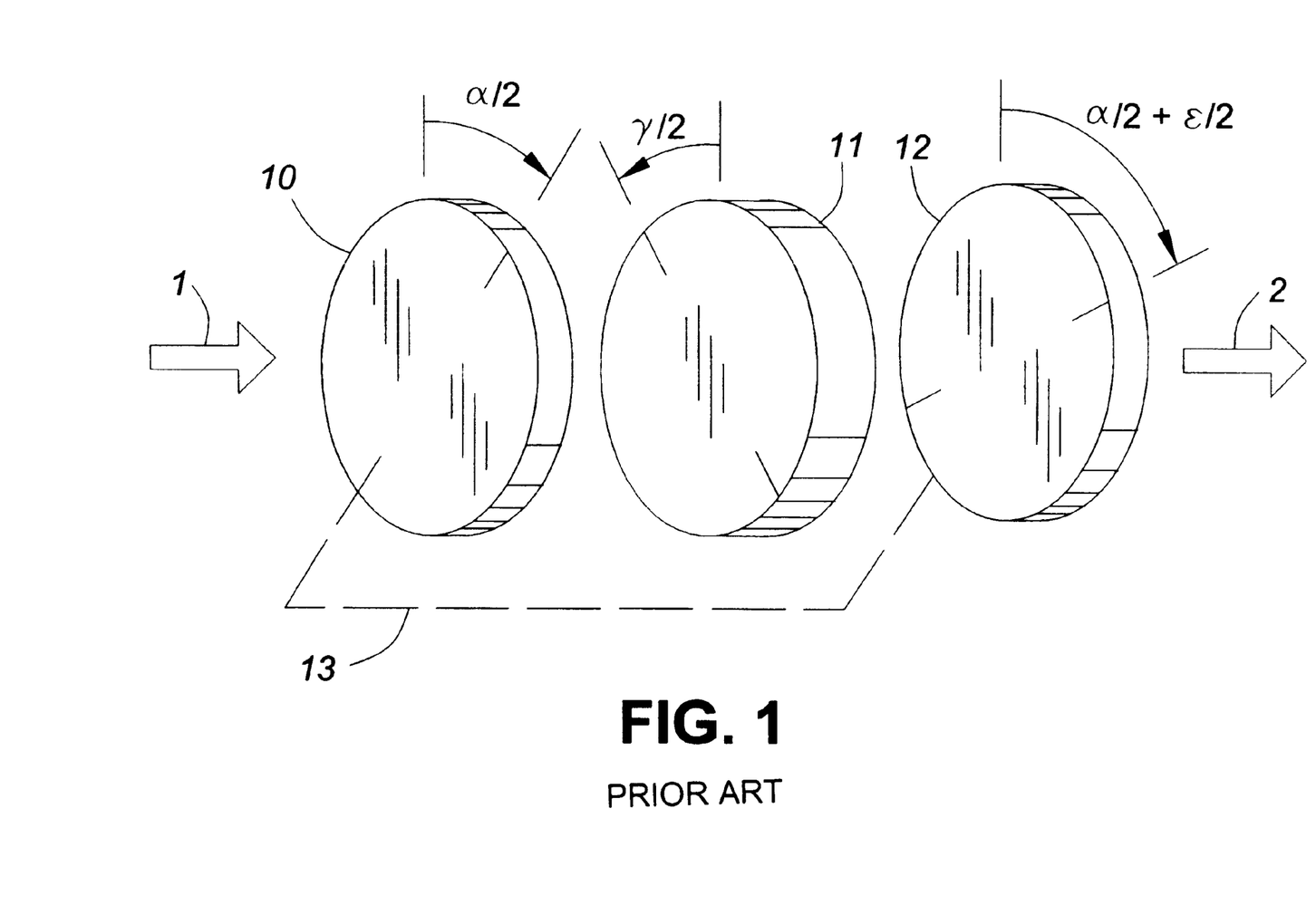
FIG. 1 is a diagram of a prior art polarization control circuit utilizing two quarter wave plates and one half wave plate.

Referring now to FIG. 1, a prior art polarization controller is shown as is described in U.S. Pat. No. 5,212,743 incorporated herein by reference, wherein three fixed wave-plates are provided each having a pair of electrodes to which a modified quadrature voltage is applied. An endless polarization controller is shown suited for applications in fiber optic coherent communication systems, where polarization controllers of essentially unlimited (endless) transformation ranges are needed to match the optical polarization states of the local oscillator laser and the received optical signal. Heismann illustrates a polarization controller which utilizes the electrooptic effect and is realized with integrated-optic strip waveguides. It allows general polarization transformations from arbitrarily varying input optical polarization states into any arbitrary output optical polarization state, requiring from the control circuit six drive voltages of limited range depending on two independent variables. Both analog and digital control circuits have been utilized to generate the independent electrical drive signals. The digital control circuit offers the advantage of higher speed operation over the analog control circuit.

Heismann in U.S. Pat. No. 5,212,743 provides an analysis of the operation of a reset-free polarization controller is based on three cascaded endlessly rotatable fractional wave elements: a first quarter-wave plate 10 followed by a half-wave plate 11 and a second quarter-wave plate 12 that is rotated synchronously with the first quarter-wave plate 10. Synchronous operation of the quarter-wave plates 10 and 12 is indicated by dashed line 13. It is shown that, for any arbitrary angular offset between the outermost elements, quarter-wave plates 10 and 12, the controller allows continuous and reset-free transformations from any varying general input state of polarization into any general output state of polarization. It is understood by persons skilled in the art that orientation of the fractional wave elements refers to the angular orientation of the same selected principal axis, either ordinary or extraordinary, with respect to a selected reference direction. The principal axes are contained in a plane which, for each fractional wave element, is perpendicular to the propagation axis of the optical beam through the controller. Dots on each wave plate depict the point at which the propagation axis passes through each wave plate.

The arrangement shown in prior art FIG. 1 allows general polarization transformations of unlimited range from the varying polarization state of input optical beam 1 to the desired polarization state of output optical beam 2, if all three wave plates 10, 11, and 12 are independently rotatable; however, the second quarter-wave plate is rotated synchronously with the first quarter-wave plate, such that their relative orientation is always constant. Hence, the polarization controller permits adjustment of only two independent parameters, namely, the angular orientation of quarter-wave plate 10 indicated as $\alpha/2$ and the angular orientation of center half-wave plate 11 indicated as $\gamma/2$. The angular offset of second quarter-wave plate 12 relative to first quarter-wave plate 12 is indicated as $\epsilon/2$ and can be arbitrary in the range between 0 and $2\pi$. In particular, quarter-wave plate 12 can be angularly oriented parallel to the first quarter-wave plate ($\epsilon=0$). In this case, the entire controller acts like an endlessly rotatable wave plate with endlessly adjustable linear phase retardation. When $\epsilon=\pi$ (crossed quarter-wave plates), the controller acts like a generalized half-wave plate, producing endlessly adjustable elliptical birefringence of constant phase retardation $\pi$.

The arrangement in FIG. 1 is realizable by using bulk optics which are commercially available and are well known to persons skilled in the art. Transducers or electro-mechanically controlled rotation stages (not shown) for the wave plates are available for varying the angular orientation of each wave plate. A control circuit similiar to the one shown in FIG. 3 can be adapted for use with the wave plates and rotation stages in order to generate control signals for causing rotation of the wave plates and for insuring synchronous rotation of quarter-wave plates 10 and 12.

Figure 2:
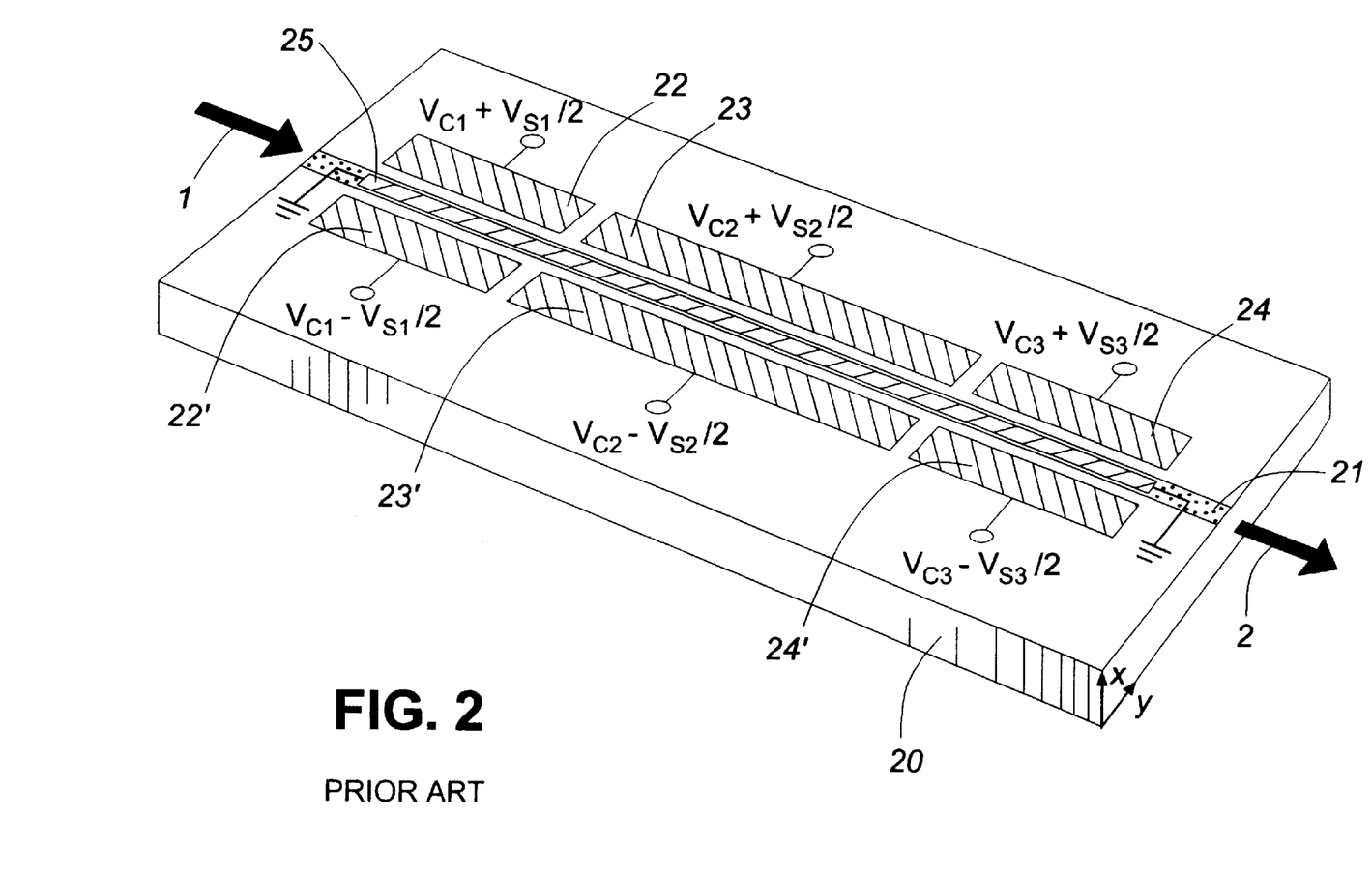
FIG. 2 is diagram of a portion of the conventional polarization modulator wherein a single pair of electrodes coupled to a block of electro-optic material.

An integrated-optic realization of the arrangement in FIG. 1 is shown in prior art FIG. 2. The polarization controller is fabricated on a low birefringence, x-cut, z-propagation $LiNbO_3$ substrate 20 and operates with a standard titanium-in diffused, single-mode waveguide 21. It employs three cascaded electrode sections corresponding to the three rotatable fractional wave plates. Each section induces an adjustable combination of TE TM mode conversion and relative TE-TM phase shifting, that is, linear birefringence of variable orientation but constant phase retardation. TE TM mode conversion is accomplished via the $r_{61}$ electrooptic coefficient by applying common drive voltage component $V_{Ci}$, where i=1, 2, or 3, to the section electrode pairs on either side of electrode 25 on top of waveguide 21, namely, electrodes 22–22', electrodes 23–23', and electrodes 24–24', while TE-TM phase shifting is accomplished via the $r_{22}$ and $r_{12}$ electrooptic coefficients by applying opposite drive voltage components $V_{Si}/2$ and $-V_{Si}/2$ to the section electrode pairs on either side of electrode 25. Center electrode 25 over waveguide 21 is shown connected to ground. The drive voltage components and the ground potential may be applied in different combinations to the three electrodes (e.g., electrodes 22, 22', and 25) in a particular section.

The first electrode section comprising electrodes 22 and 22' and grounded electrode 25 is driven by voltages $V_{C1}=(V_0/2)\sin \alpha$.

$V_{S1}=V_T+(V_\pi/2)\cos \alpha$.

When driven by these voltages, the section of the integrated-optic device is said to act like a quarter-wave plate oriented at a variable angle $\alpha/2$.

The second electrode section comprising electrodes 23 and 23' and grounded electrode 25 is driven by voltages $V_{C2}=V_0 \sin \gamma$.

$V_{S2}=V_T+V_\pi \cos \gamma$.

When driven by these voltages, the section of the integrated-optic device is said to act like a half-wave plate oriented at a variable angle $\gamma/2$.

The third electrode section comprising electrodes 24 and 24' together with grounded electrode 25 is driven by voltages $V_{C3}=(V_0/2)\sin(\alpha+\epsilon)$ $V_{S3}=V_T+(V_\pi/2)\cos(\alpha+\epsilon)$.

When driven by these voltages, this section of the integrated-optic device is said to act like a quarter-wave plate oriented at a variable angle $(\alpha+\epsilon)/2$.

In the equations defining the drive voltages to all three electrode sections described above, $V_0$ denotes the voltage required for complete TE TM mode conversion and $V_\pi$.

denoted the voltage for inducing a TE-TM phase shift of π. Additional bias voltage $V_T$ is applied to compensate for any residual birefringence in the waveguide. In an illustrative example of the polarization controller in operation, the bias voltages were determined as follows $V_0 \sim 19$ V, $V_\pi \sim 26$ V, and $V_T \sim 54$ V where the polarization controller had a length of approximately 5.2 cm.

For practical applications, two special cases $\epsilon=0$ and $\epsilon=\pi$ are of particular interest. In the first case, both quarter-wave plate sections are driven by the same voltages, $$V_{C3}=V_{C1}$$

$$V_{S3}=V_{S1}$$

whereas in the second case, the two quarter-wave plate sections are essentially driven by voltages of opposite polarities, $$V_{C3}=-V_{C1}$$

$$V_{S3}=-V_{S1}+2V_T.$$

U.S. Pat. No. 5,212,743 describes in the electrooptic operation within the polarization controller.

Figure 6A:
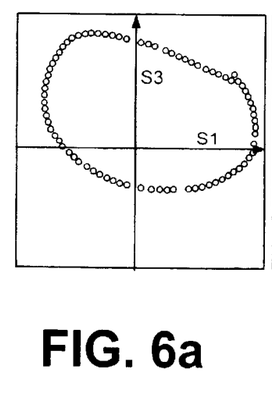
FIGS. 6a, 6b and 6c are a drawing illustrating resulting half waveplate contour with no phase difference between the two sub quarter waveplates.
Figure 6B:
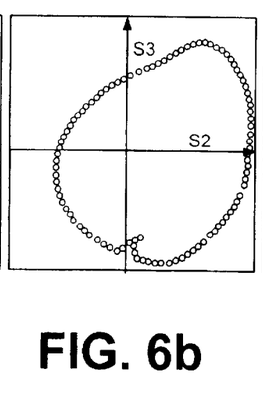
Figure 6C:
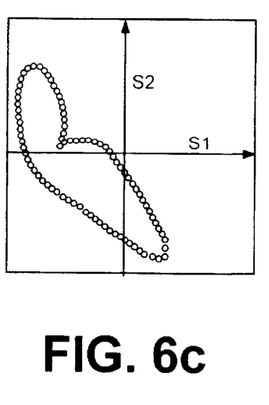
Figure 7A:
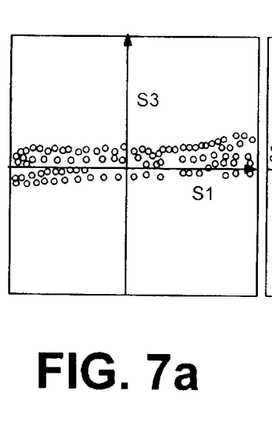
FIGS. 7a, 7b and 7c are a drawing illustrating a resulting half wave plate contour when a non zero phase difference is applied between the two quarter waveplate sections.
Figure 7B:
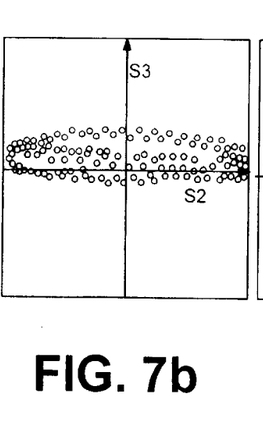
Figure 7C:
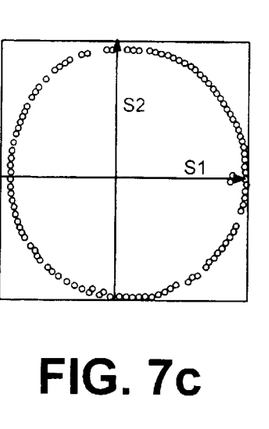
Figure 8A:
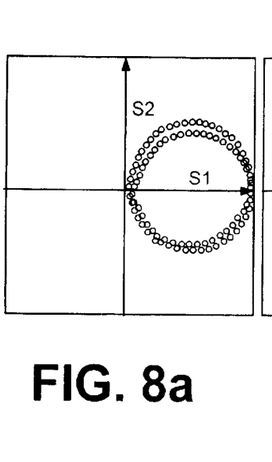
FIG. 8 is a diagram of the resulting QWP contour when a non zero phase shift is applied to the two $\frac{1}{8}^{th}$ sub sections.
Figure 8B:
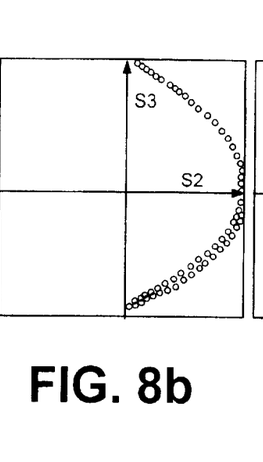
Figure 8C:
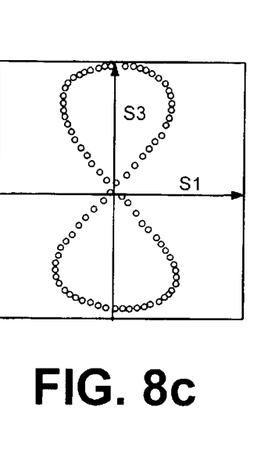

The common electrode in the polarization controller must be perfectly aligned with the indiffused guiding section chip. Over the long length required for full polarization transformation there is an alignment offset from one end to the other. The small alignment offset causes the electric field to rotate non-uniformly. Rotating in such a manner causes the resulting contour to be non-ideal, and in some cases may have a kink such as is illustrated in the HWP illustrations in FIG. 6a, 6b, and 6c; in this instance the HWP has no phase offset on the electrodes. If the quarter wave section is subdivided into smaller sections then each section can be fine tuned so that in parallel the non-ideal fabrication effects of the waveguide will be cancelled out. The more subdivisions that are imposed on a waveplate the more ideal that waveplate will become. In an ideal quarter or half waveplate for all rotation angles of the electrooptic waveplate the net retardance will yield either a quarter of half waveplate respectively. This was determined experimentally, whereby if the waveplates are not ideal the controller will experience glitches. During non-ideal operation for a given full waveplate rotation the retardance will not remain constant and vary as a function of the angle. In the instance of a glitch the waveplates dither in a fixed position while the desired output SOP drops in power; effectively making the convergence spot larger on a Poincaré sphere. For instance a non-ideal waveplate can be seen in FIGS. 6a, 6b and 6c as compared to FIGS. 7a, 7b and 7c, where a kink occurs in the contour in terms of polarization transform space (S1, S2 and S3 are the usual Stokes vectors). The controller may get caught in this spot at a given angle where the other waveplates will not be able to provide the necessary retardance to maintain a constant output power and as a result glitch will occur. The more ideal the waveplates the more ideal the transformation from the input SOP to the desired output SOP and as a result a lower desired output SOP spot size, or desired output power ripple. Upon improving each of the waveplates by applying phase offsets to smaller subsections the device exhibits a more desired SOP spot size. This is illustrated in FIGS. 7a, 7b, and 7c, where the output is significantly improved from that shown in FIGS. 6a, 6b, and 6c, and wherein the HWP is made from four $\frac{1}{8}^{th}$ sections phased together.

Using three fixed sections in a device, such as the one disclosed by Heismann yields limited tracking, however the applicant had difficulty illustrating that tying the last QWP to the first QWP as described in Heismann produces satisfactory results. In the instant invention at least three different dither parameters are preferably used, one for each waveplate.

Figure 3:
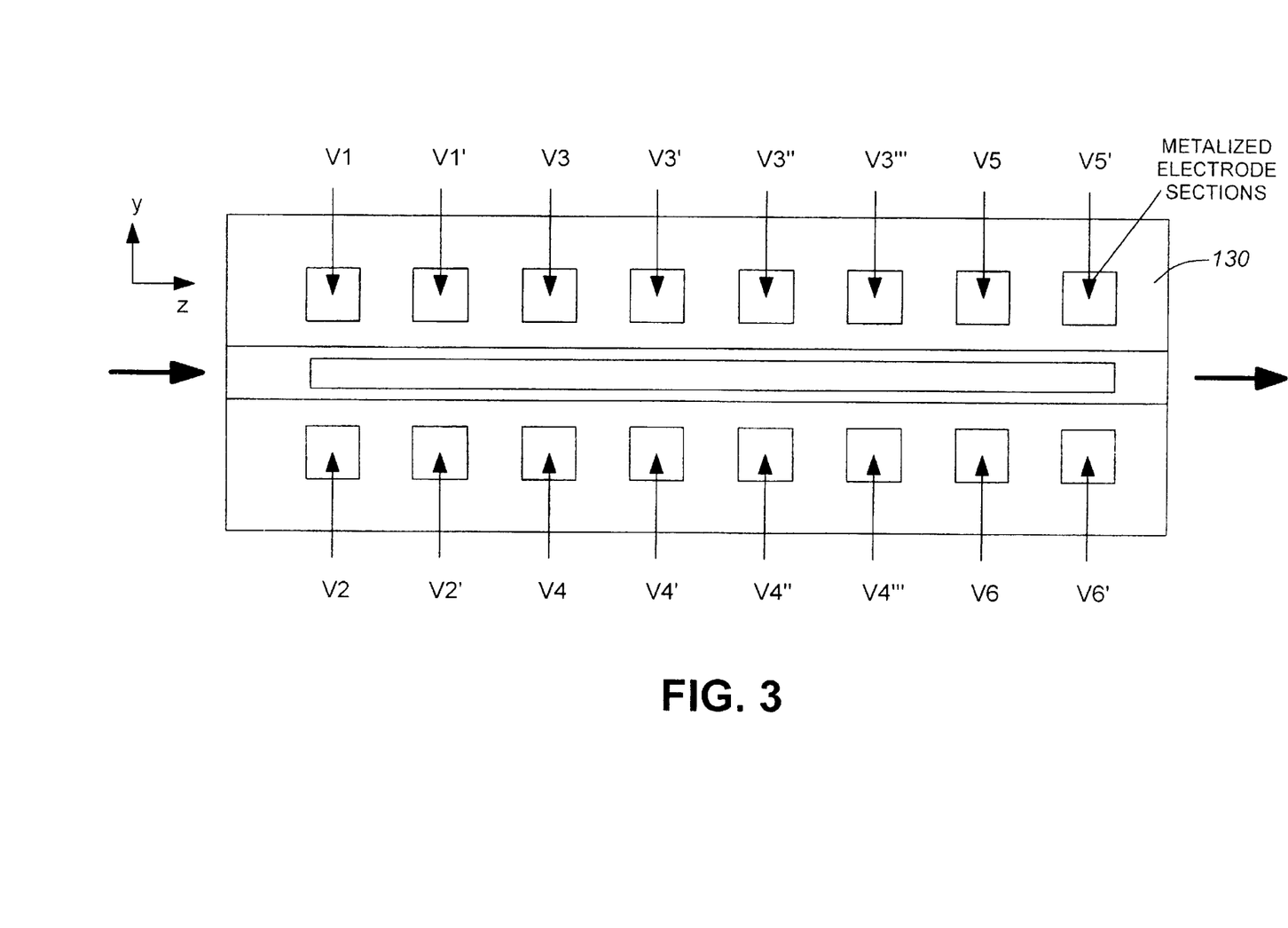
FIG. 3 is a diagram of a polarization controller circuit utilizing two nearly ideal quarter wave plates and one nearly ideal half wave plate in accordance with an embodiment of the invention.

Referring now to FIG. 3, an embodiment of the invention is shown wherein a single block of birefringent material 130 is shown having pairs of electrodes (V1 V2), (V1' V2'), (V3 V4), (V3' V4'), (V3" V4"), (V3'" V4'"), (V5 V6) and (V5' V6') forming a polarization controller. Of course a suitably programmed controller having associated control circuitry, not shown, is required to appropriately apply required voltages to the electrodes in response to detected polarization states.

The first quarter waveplate is formed by applying voltages to electrode pairs, electrodes ($V_1$ $V_2$), and ($V_{1'}$, $V_{2'}$) with respect to a common centrally disposed ground terminal GND. A first half waveplate is formed by applying voltages to electrode pairs ($V_3$ $V_4$), ($V_{3'}$ $V_{4'}$), ($V_{3''}$ $V_{4''}$), ($V_{3'''}$ $V_{4'''}$) with respect to the common the centrally disposed ground terminal GND; and, a second quarter waveplate is formed by applying voltages to electrode pairs ($V_5$ $V_6$) and ($V_{5'}$ $V_{6'}$) with respect to the common centrally disposed ground terminal GND.

For example the first quarter waveplates would have the voltages of the following form:

$$V_1 = V_{S1}\sin(\theta) + V_{S1}\cos(\theta) + V_{T1}$$

$$V_2 = V_{S2}\sin(\theta) + V_{S2}\cos(\theta) + V_{T2}$$

and wherein a second of the two voltages comprises two second sub-voltages of the form:

$$V_{1'} = V_{S1'}\sin(\theta+\alpha) + V_{S1'}\cos(\theta+\alpha) + V_{T1'}$$

$$V_{2'} = V_{S2'}\sin(\theta+\alpha) + V_{S1'}\cos(\theta+\alpha) + V_{T2'}$$

Where $0 < \alpha < 360°$ and where $\theta$ can be any angle and endlessly varying The primary voltage contour is found by setting the angle $\alpha$ to 0, $V_{S1}=V_{S1'}$, $V_{C1}=V_{C1'}$, $V_{T1}=V_{T1'}$, $V_{S2}=V_{S2'}$, $V_{C2}=V_{C2'}$, $V_{T2}=V_{T2'}$.

Subsequently, fine-tuning is accomplished through changing the phase relationship between the drive voltages, $\alpha$, as well as altering the drive voltage magnitudes on the second linked section, or subsequent linked section(s), until desirable waveplate contour results.

Figure 4:
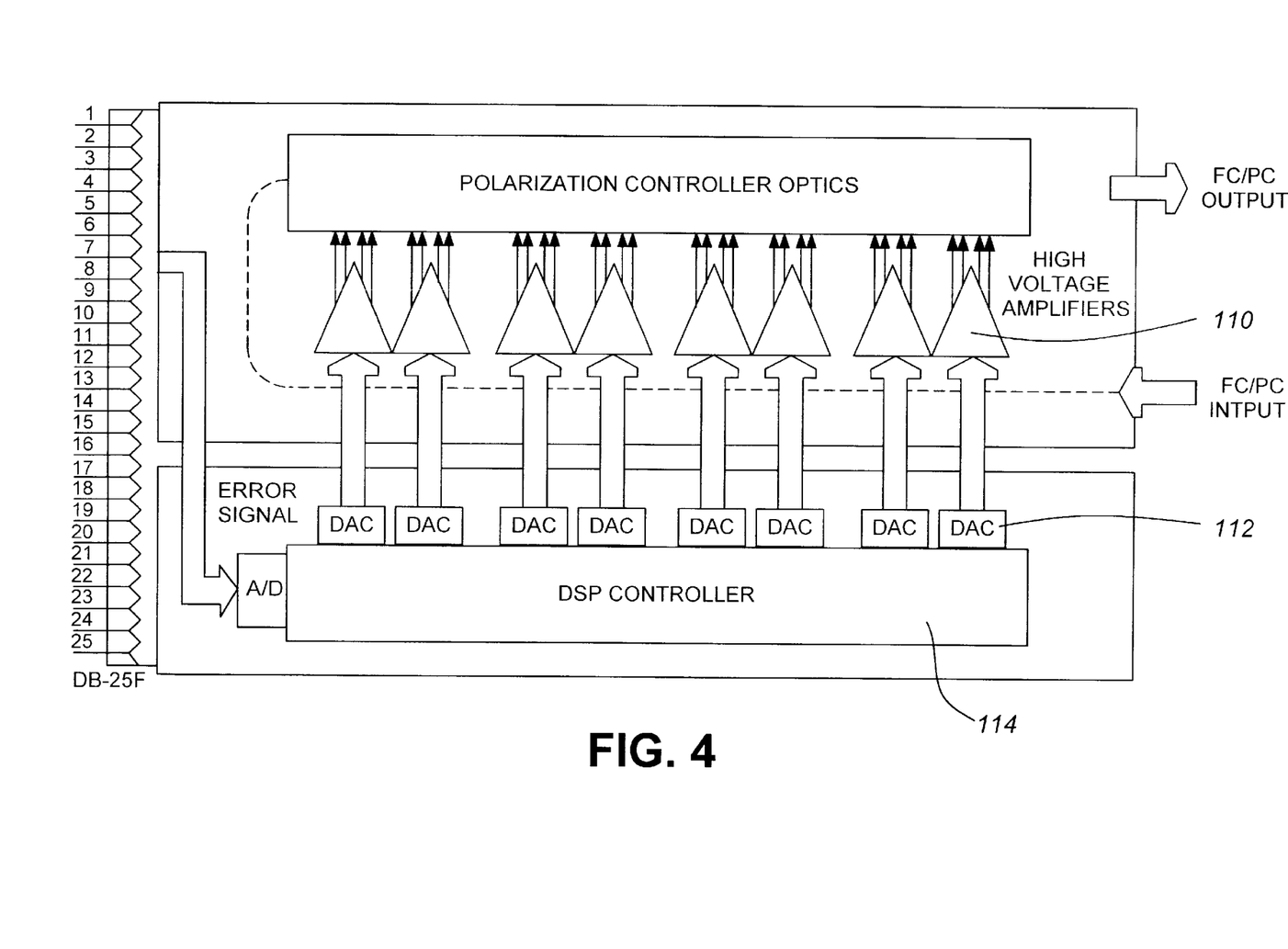
FIG. 4 is a diagram of a control circuit for controlling a polarization controller in accordance with the invention; and, FIG. 5 is a diagram of a preferred embodiment of the invention illustrating a block of birefringent material having a plurality of pairs of metalized electrodes thereon forming a nearly ideal quarter waveplate.

FIG. 4 is simplified diagram of a control circuit in accordance with the invention.

A digital signal processor (DSP) provides values to a digital to analog (D/A) converter 112 which provides control voltages to an amplifier 110. Output terminals of the amplifier are coupled directly to the terminals of the waveguide where the voltage is applied. Control is maintained by way of an error feed-back signal which is provided to the DSP 114 by way of an analog-to-digital (A/D) converter 116. In operation, the waveplate sections are dithered sequentially.

Figure 5:
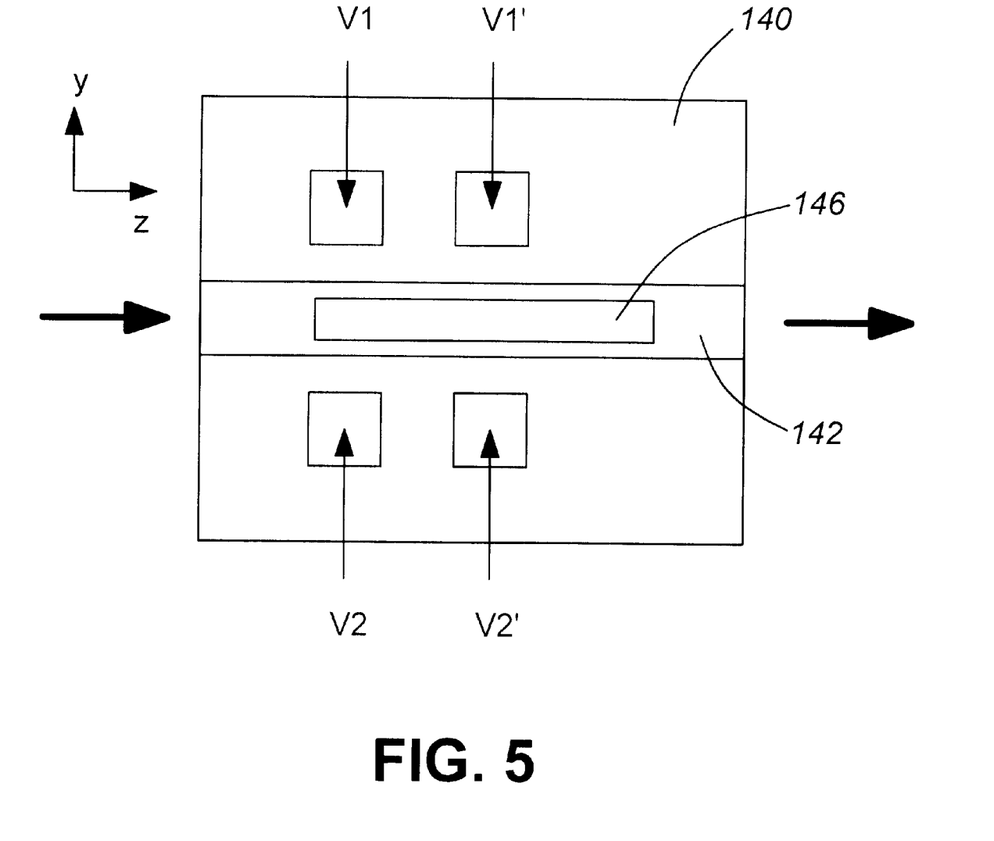

FIG. 5 is a diagram of an ideal quarter waveplate 140 in accordance with an embodiment of this invention. The quarter waveplate 140 is formed of a suitable length of birefringent material, for example a low birefringence, x-cut, z-propagation $LiNbO_3$ substrate 20 and operates with a titanium-indiffused single-mode waveguide 142. Centre electrode 146 is connected to ground. It is understood that the drive voltage components and the ground potential may be applied in different combinations to the 5 electrodes, V1 V2, V1' V2' and 146. The quarter waveplate 140 is actually comprised of two eighth waveplates, and each $\frac{1}{8}^{th}$ can be individually controlled.

Advantageously, applying voltages to two or more shorter sections of a waveguide based polarization controller and varying the applied voltage phase relationship between adjacent sections to obtain a more ideal retardance of $\pi/2$, $\pi$, or $2\pi$ or a multiple thereof results in a segmented waveplate being a single entity however being comprised of phase separated single voltages. Applying different sine and cosine coefficients in the manner as described above in accordance with this invention provides a more controllable ideal waveplate for all rotation angles than prior art devices operating on similar principles.

Numerous other embodiments of the invention can be envisaged without departing from the spirit and scope of the invention. For example, this invention is not limited to providing two pairs of electrodes sharing a common ground terminal; in other embodiments not shown, even more electrode pairs can be provided to form a quarter or half waveplate or waveplates.

Figure 9:
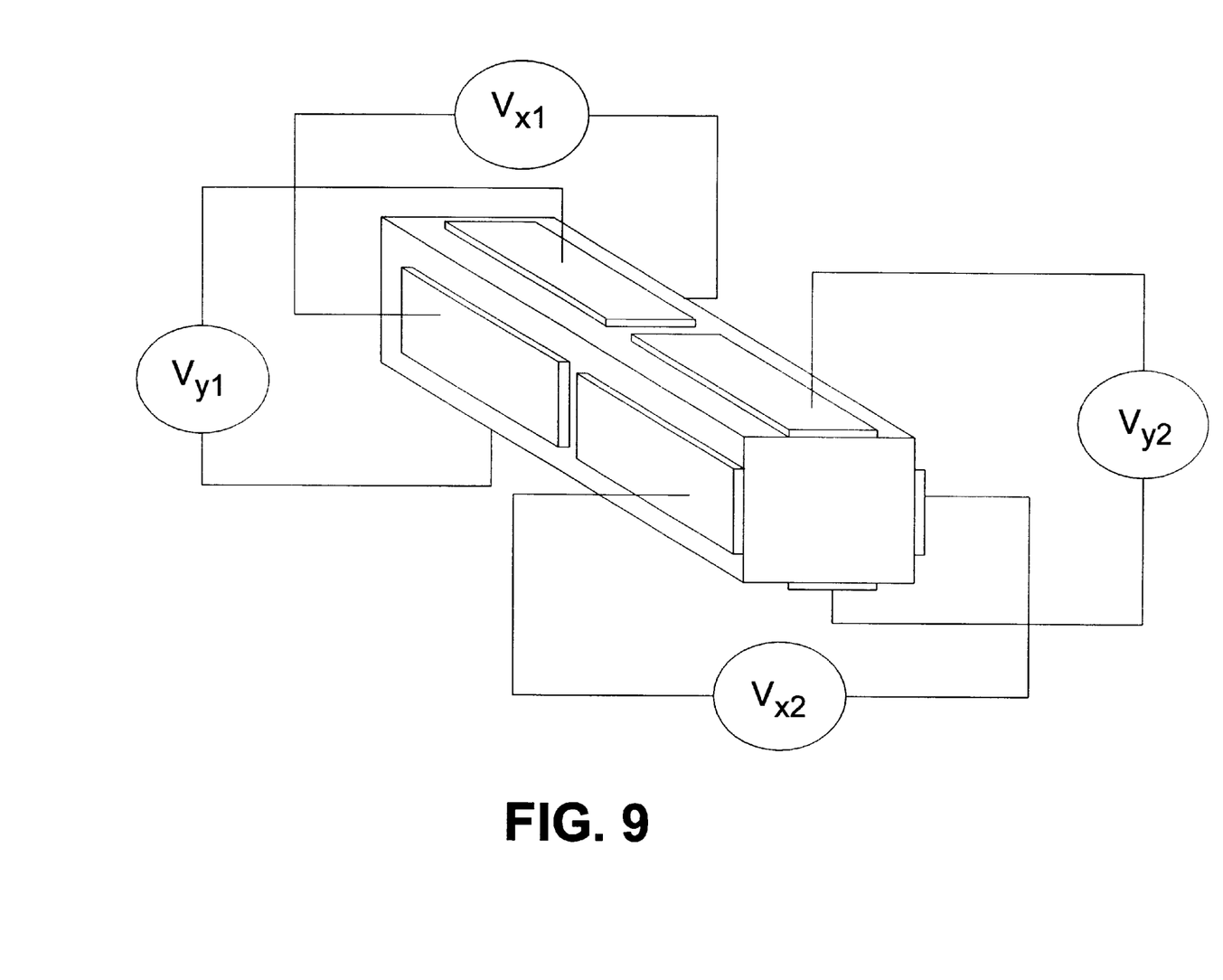
FIG. 9 is a drawing illustrating a bulk crystal having electrodes disposed on two pairs of opposing faces of the block.

In yet another embodiment shown in FIG. 9 electrodes are disposed on two opposing pairs of faces of a block of birefringent material; in order to provide similar control such that a fixed retardance can be achieved for all angles of rotation, the waveplate can have several segments with essentially same voltages applied with a phase offset therebetween. Hence voltages having a phase offset can be applied to terminals Vx1 and Vx2 and on orthogonal terminals on two other opposing faces voltages having a phase offset can be applied to terminals Vy1 and Vy2.

What is claimed is:

1. An electro-optic waveplate for changing the state of polarization of light passing therethrough while providing a substantially constant birefringence when the principal birefringent axes of the electro-optic waveplate are rotated, comprising:

a birefringent material having two principal orthogonal birefringent axes that are rotatable in the presence of suitably applied voltages, the birefringent material having a first end and a second end and having a longitudinal axis of length L defined therebetween;

at least four voltage sources providing at least four related different voltages simultaneously along sequential or contiguous regions of the birefringent material for providing at least four controllable and varying electric fields to the birefringent material, such that retardance of the birefringent material remains substantially constant while the birefringent axes thereof are rotated for changing the state of polarization of light passing therethrough to a desired state, wherein the at least four different voltages have a phase relationship or a phase and magnitude relationship therebetween.

2. An electro-optic waveplate as defined in claim 1, wherein the substantially constant total retardance is equal to one of a quarter wavelength or a half wavelength for a predetermined wavelength of light passing therethrough.

3. An electro-optic waveplate as defined in claim 2, wherein the voltages are suitable to substantially compensate for variations in the birefringent material and/or suitable to overcome non-uniformity in performance which would otherwise occur in the absence of a varying electric field along the length L and in the presence of a non-varying electric field along the length L.

4. An electro-optic waveplate as defined in claim 1, wherein two of the at least four different voltages have a constant phase offset therebetween.

5. An electro-optic waveplate as defined in claim 1, wherein two of the voltages are of the form:

$$V_1 = V_{S1} \sin(\theta) + V_{C1} \cos(\theta) + V_{T1}$$

$$V_1 = V_{S1'} \sin(\theta+\alpha) + V_{C1'} \cos(\theta+\alpha) + V_{T1'}.$$

6. An electro-optic waveplate as defined in claim 1, wherein two of the voltages are in the form of a first sinusoidal voltage and a second sinusoidal voltage, which is substantially the same as the first sinusoidal voltage with the exception of having a phase offset.

7. An electro-optic waveplate as defined in claim 1, wherein the waveplate provides a constant quarter or half wave of retardance, wherein two of the different voltages are of the form:

$$V_1 = V_{S1} \sin(\theta) + V_{C1} \cos(\theta) + V_{T1}$$

$$V_2 = V_{S2} \sin(\theta) + V_{C2} \cos(\theta) + V_{T2};$$

and wherein two of the voltages are of the form:

$$V_{1'} = V_{S1'} \sin(\theta+\alpha) + V_{C1'} \cos(\theta+\alpha) + V_{T1'}$$

$$V_{2'} = V_{S2'} \sin(\theta+\alpha) + V_{C2'} \cos(\theta+\alpha) + V_{T2'}$$

where $0 < \alpha < 360°$ and where $\theta$ can be any angle and endlessly varied.

8. A polarization controller comprising a waveplate as defined in claim 1, and further comprising two other waveplates optically coupled therewith.

9. A quarter waveplate or a half waveplate comprising a first pair of electrodes spaced apart along a block of birefringent material serving as voltage terminals to provide two different and related electric fields through the material simultaneously in response to two different applied voltages;

a second pair of electrodes spaced apart along the block of birefringent material serving as voltage terminals to provide two other electric fields through the material simultaneously in response to two other applied voltages; and means for applying voltage of the form $$V_1 = V_{S1} \sin(\theta) + V_{C1} \cos(\theta) + V_{T1}$$

$$V_2 = V_{S2} \sin(\theta) = V_{C2} \cos(\theta) + V_{T2}$$

to the first electrodes, and voltages of the form:

$$V_{1'} = V_{S1'} \sin(\theta+\alpha) + V_{C1'} \cos(\theta+\alpha) + V_{T1'}$$

$$V_{2'} = V_{S2'} \sin(\theta+\alpha) + V_{C2'} \cos(\theta+\alpha) + V_{T2'}$$

to the second electrodes,
   where $0 < \alpha < 360°$ and where $\theta$ can be any angle and endlessly varying.

10. A polarization controller comprising:

electrically controllable waveplates arranged in a predetermined spatial relationship having a same longitudinal axis of propagation to allow light launched into one of the waveplates to propagate through the other of the waveplates, one of the waveplates including plural pairs of electrodes spaced across an electro-optical material to provide at least four different electric fields simultaneously along the axis of propagation through the electro-optical material to change the state of polarization of light propagated therein in the presence of suitably applied voltages; and, means for providing the suitably applied voltages to yield the at least four different electric fields, such that a substantially quarter or half wavelength of retardance will result for light passing therethrough;

wherein the at least four different electric fields are of a magnitude and phase to ensure a substantially constant retardance through said one waveplate as birefringent axes of the waveplate are rotated.

11. A polarization controller as defined in claim 10, wherein the waveplates are formed on a same block of electro-optical material; and wherein the waveplates each have at least two pairs of terminals for applying at least four related different voltages to each waveplate.

12. A polarization controller as defined in claim 11, wherein each of the quarter waveplates are formed of two eighth waveplates each having two controllable voltage sources.

13. A method of providing a near-ideal quarter or half waveplate comprising the steps of:

launching an optical signal into a block of electro-optical material having a length L;

providing four different voltages simultaneously to the block of electro-optical material that will yield four different electric fields therethrough along the length L, wherein the voltages have a magnitude or a phase relationship therebetween; and ensuring that the voltages are sufficient to provide a substantially constant retardance along the length L in the presence of the four different fields.

14. A polarization transformer for controlling the polarization and phase of an optical signal comprising:

a block of electro-optical material having a plurality of electrode pairs thereon for applying quadrature voltages thereto, each pair of terminals having a third common terminal disposed therebetween, said block of birefringent material, in the presence of an applied voltage for forming a near-ideal controllable waveplate, a first plurality of the plurality of pairs of electrodes for inducing a phase retardation of an optical signal passing through the block of substantially about $\pi/2$ radians and forming a first quarter waveplate; a second plurality of the pairs of electrodes for inducing a phase retardation of an optical signal passing through the block of substantially about $\pi$ radians forming a first half waveplate; and, a third plurality of the plurality of pairs of electrodes for inducing a phase retardation of an optical signal passing through the block of substantially about $\pi/2$ radians and forming a second quarter waveplate.

* * * * *